United States Patent [19]

Krutchen et al.

[11] Patent Number: 4,485,059
[45] Date of Patent: Nov. 27, 1984

[54] POLYMER FOAM THERMOFORMATION PROCESS AND APPARATUS THEREFOR

[75] Inventors: Charles M. Krutchen, Pittsford; Wen-Pao Wu, Victor, both of N.Y.

[73] Assignee: Mobil Oil Corporation, New York, N.Y.

[21] Appl. No.: 489,427

[22] Filed: Apr. 28, 1983

[51] Int. Cl.³ .............................................. B29D 27/00
[52] U.S. Cl. ........................................ 264/51; 34/155; 264/321; 264/322; 264/DIG. 15; 264/DIG. 65; 425/384; 425/817 C; 425/DIG. 39; 432/59
[58] Field of Search ....... 264/321, DIG. 15, DIG. 65, 264/51, 322; 34/60, 155; 432/42, 59; 425/DIG. 39, 384, 817 C

[56] References Cited

U.S. PATENT DOCUMENTS

| | | | |
|---|---|---|---|
| 3,189,399 | 6/1965 | Jacobs et al. | 425/157 |
| 3,200,437 | 8/1965 | Sasanko | 264/DIG. 15 |
| 3,359,600 | 12/1967 | O'Brien et al. | 425/157 |
| 3,518,334 | 6/1970 | Carrigan et al. | 264/321 X |
| 3,830,611 | 8/1974 | Irwin | 425/157 X |
| 4,056,587 | 11/1977 | Honkanen et al. | 264/DIG. 15 |
| 4,302,415 | 11/1981 | Lake | 264/321 X |

OTHER PUBLICATIONS

Plastics Technology, Apr. 1980, pp. 19 and 20, "Process Engineering News", In-Line Process Makes Laminated Paper/PS Foam Board, Section: The Post Expander: Heart of the System.

*Primary Examiner*—Philip Anderson
*Attorney, Agent, or Firm*—Alexander J. McKillop; Michael G. Gilman; James P. O'Sullivan, Sr.

[57] ABSTRACT

A method of thermoforming comprising providing a continuous sheet of thermoplastic polymeric foam, transporting said sheet through an atmosphere of at least predominantly steam at a temperature of at least 215° F. maintaining said sheet in said atmosphere for a time sufficient to cause a decrease in the density thereof; thereafter while under the influence of said temperature, deforming at least a portion of said sheet to a predetermined shape and while so deformed, cooling the same to cause retention of said shape and a system for carrying out said method.

7 Claims, 1 Drawing Figure

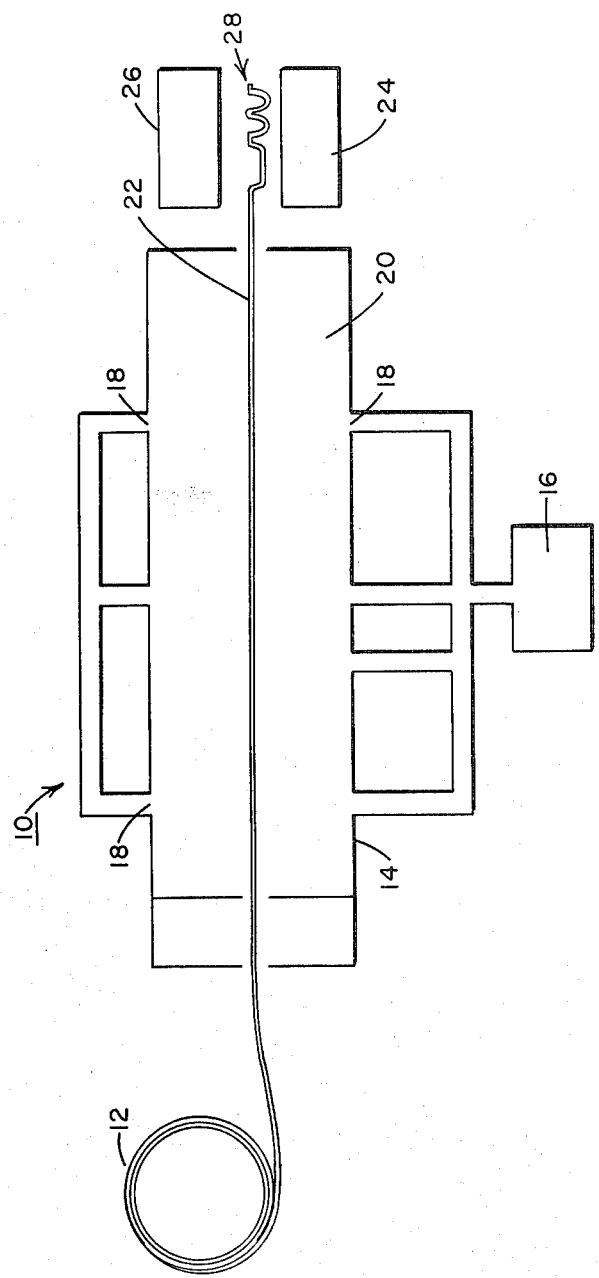

POLYMER FOAM THERMOFORMATION PROCESS AND APPARATUS THEREFOR

BACKGROUND OF THE INVENTION

This invention relates to a novel method for thermoforming a foamed polymer in sheet form and a system therefor.

In prior art techniques of thermoforming extruded polystyrene sheet, it is common practice to permit the extruded sheet to age for a period of from three to five days in order to obtain the desired foam density reduction. It is also current practice to employ radiant heating to expand the so-aged foam sheets and to heat the same to a temperature suitable for thermoformation. Freshly extruded, unaged foam sheets yield less than a 20% density reduction.

It is an object of the present invention to acheive excellent reduction in foam density regardless of aging time.

It is an additional object of the present invention to present a process which simultaneously treats the foam polymer in order to reduce the density thereof and also bring the foam to the optimum temperature for thermoformation.

SUMMARY OF THE INVENTION

The present invention relates to a process of thermoforming comprising:

(a) providing a continuous sheet of thermoplastic polymeric foam;

(b) transporting said sheet through an atmosphere of at least predominantly steam at a temperature of at least 215° F.;

(c) maintaining said sheet in said atmosphere for a time sufficient to cause a decrease in the density thereof;

(d) thereafter while under the influence of said temperature, deforming at least a portion of said sheet to a predetermined shape; and (e) while so-deformed, cooling the same to cause retention of said shape.

The present invention also relates to a system for thermoforming a continuous sheet of thermoplastic foam. The system comprises in combination:

(a) means for transporting said foam in single layer form;

(b) means for treating said foam, during its transport in single layer form, with an atmosphere of predominantly steam at a temperature of at least 215° F.; and (c) means in association therewith for receiving said sheet in thermoformable condition for, deforming at least a portion of said sheet to a predetermined shape, and for cooling the same to retain said shape.

THE DRAWING

The FIGURE is a longitudinal sectional view of a schematic illustration of the steam atmosphere treatment and thermoformation apparatus employed in the process of the present invention.

DETAILED DESCRIPTION OF THE INVENTION

Referring to the drawing, the steam treatment and thermoformation apparatus 10 is designed to receive a sheet of thermoformable polymeric thermoplastic foam sheet from a suitable source, such as a roll 12. The foam sheet can be of any suitable width, for example, from one foot to several feet or more in width. Such a sheet can be transported into and through a steam chamber 14 by any suitable transport means not shown. For example, roller conveyors or sheet edge clamp means can be used to transport the sheet through the chamber. The chamber is equipped with steam inlet ports 18 which ports are in communication with a steam source 16. Steam source 16 is any suitable means which can generate and transport to the steam inlet ports 18, superheated steam, heated to a temperature of 215° F. or above. The system is designed to create an atmosphere 20 which is at least predominantly steam but which also can have a minor proportion of air therein. In operation, as the polymeric foam sheet traverses the system, from the region of entrance into the steam chamber to a point remote therefrom, further to the interior of the steam chamber, the combined action of the steam and temperature causes a significant reduction in foam density by the time the foam sheet reaches the region designated 22 in the drawing. Thereafter the reduced density foam is transported to any suitable thermoforming means, such as, female mold 24 acting in association with male mold 26 to effect a thermoformed structure 28 in the reduced density foam. It is important that the atmosphere within the steam chamber be maintained at about 215° F. and above. This can be accomplished by the provision of some auxiliary heater means which will maintain the appropriate temperature within the steam chamber, e.g. by conduction. This temperature will vary depending upon the nature of the polymer foam. Heater tapes, coils or the like can be employed.

While any thermoformable foam can be employed in the process and system of the present invention, a preferred foam is a styrenic foam. Of the styrenic foams particularly preferred is polystyrene or poly(paramethylstyrene) foam sheet. When employing the styrenic foams, a preferred temperature range for both treatment and thermoformation is from about 215° F. to about 275° F. Particularly preferred is a treatment and thermoformation temperature of between about 230° F. to about 260° F. Prior to thermoformation, it is preferred that the steam treatment and temperature conditions be such that the density decrease of the foam polymer is preferably at least about 33%. It is important that the "sag temperature" be avoided during the treatment and thermoformation of the foam sheet. The "sag temperature" can be defined as that temperature at which the foam polymer can no longer rigidly support itself and tends to sag because its self-sustaining rigidity is being lost due to temperature increase.

While not limited to a continuous process, it is to be understood that freshly prepared polymer foam can be transported directly from the extruder to the subject treating chamber and thermoformer. In the alternative, the foam sheet can be inventoried after formation and, when needed, the foam can be treated according to the subject process.

EXAMPLE

As an example of a continuously operated process within the scope of the present invention, polystryrene foam can be prepared and thermoformed as follows:

Polystyrene resin pellets can be admixed with a nucleating agent comprised of sodium bicarbonate and anhydrous citric acid. The nucleating agent can constitute 0.58% by weight based upon the total weight of the polystyrene being charged. The acid to bicarbonate ratio can be the 1:0.76. These materials are continuously fed into a hopper of, for example, a 2½ inch diameter screw extruder having a L/D of 24:1. The extruder is operated at an extrusion rate of about 150 lbs. per hour. By means of extruded barrel heaters, the portion of the extruder barrel surrounding the feed zone of the extruder is maintained at a temperature of about 220° F. In the heat plasticizing zone, the pentane injection zone, and the mixing zone, the extruder barrel is maintained at a temperature of about 400° F. to 450° F. About 5% by weight of pentane, based upon the total weight of resin and nucleating agent, is injected into the polystyrene composition at a point beyond the feed zone where the polystyrene is in a molten condition. The molten mass is then passed through the extruder mixing zone and a cooling zone where it is cooled to 290°-320° F., and then extruded through an annular die orifice as a tubular foamed sheet. The tubular foam is passed about and over a mandrel designed to at least generally assist in maintaining a substantially uniform diameter within the extruded foam polymer tube. Thereafter, a knife or other cutting means cuts through one wall of the extruded tube and the same is open to form a single wide sheet of extruded foam. This sheet is then transported through the steam chamber of the present invention.

The chamber is continually maintained, for example, at approximately 80% partial pressure steam with the remainder being air. The chamber also is continually maintained at a temperature of between 230°-240° F. utilizing auxiliary heaters to maintain the steam atmosphere at this temperature. The residence time within the chamber is approximately 30 seconds. After the foam has been reduced in density by about 33%, the sheet is thermoformed into a plurality of articles such as meat trays. The steam treatment will result in a gauge increase of at least 50% prior to thermoformation. This degree of gauge increase is at least equivalent to that obtained when the same polystyrene sheet foam is conventionally aged at ambient for from three to five days.

What is claimed is:

1. A method of thermoforming comprising:
   (a) providing a continuous sheet of thermoplastic polymeric foam;
   (b) transporting said sheet thru an atmosphere of at least predominantly steam at a temperature of at least 215° F., any non-steam component being composed of air;
   (c) maintaining said sheet in said atmosphere for a time sufficient to cause a decrease in its density;
   (d) thereafter while under the influence of said temperature, deforming at least a portion of said sheet to a predetermined shape; and
   (e) while so-deformed, cooling the same to cause retention of said shape.

2. The method of claim 1 wherein said atmosphere is at a temperature of from about 215° F. to below the sag temperature of said sheet.

3. The method of claim 2 wherein said thermoplastic polymeric foam sheet is a styrenic polymer.

4. The method of claim 3 wherein said styrenic polymer is a member selected from the group consisting of polystyrene and poly(p-methylstyrene).

5. The method of claim 4 wherein said temperature is from about 215° F. to about 275° F.

6. The method of claim 5 wherein said density decrease is at least about 33%.

7. A system for thermoforming a continuous sheet of thermoplastic foam comprising in combination:
   (a) means for transporting said foam in single layer form;
   (b) means for treating said foam, during its transport in single layer form, with an atmosphere of predominantly steam at a temperature of at least 215° F., any non-steam component being composed of air; and
   (c) means in association therewith for receiving said sheet in thermoformable condition, for deforming at least a portion of said sheet to a predetermined shape and for cooling the same to retain said shape.

* * * * *